United States Patent
Joung et al.

(10) Patent No.: US 11,261,563 B2
(45) Date of Patent: Mar. 1, 2022

(54) HEAT INSULATION COMPOSITION FOR IMPROVING HEAT INSULATION AND SOUNDPROOFING FUNCTIONS, CONTAINING AEROGEL, AND METHOD FOR MANUFACTURING HEAT INSULATION FABRIC BY USING SAME

(71) Applicant: ARMACELL JIOS AEROGELS LIMITED, Hong Kong (HK)

(72) Inventors: Young chul Joung, Hwaseong (KR); Myung je Roh, Seoul (KR); Jong chul Park, Osan (KR); Min woo Kim, Daejeon (KR); Mun hyeong Lee, Osan (KR); Choon Soo Hahn, Jeollabuk-do (KR)

(73) Assignee: ARMACELL JIOS AEROGELS LIMITED, Hong Kong (HK)

( * ) Notice: Subject to any disclaimer, the term of this patent is extended or adjusted under 35 U.S.C. 154(b) by 29 days.

(21) Appl. No.: 16/409,676

(22) Filed: May 10, 2019

(65) Prior Publication Data
US 2019/0264381 A1     Aug. 29, 2019

Related U.S. Application Data

(60) Division of application No. 15/005,570, filed on Jan. 25, 2016, now abandoned, which is a continuation of
(Continued)

(30) Foreign Application Priority Data

Jul. 24, 2013    (KR) .................. 10-2013-0087396

(51) Int. Cl.
*B01J 13/00*    (2006.01)
*C04B 14/06*    (2006.01)
(Continued)

(52) U.S. Cl.
CPC .......... *D06M 11/74* (2013.01); *B01J 13/0091* (2013.01); *D06M 11/46* (2013.01); (Continued)

(58) Field of Classification Search
CPC ...... D06M 11/46; D06M 11/49; D06M 11/74; D06M 15/09; D06M 15/263;
(Continued)

(56) References Cited

U.S. PATENT DOCUMENTS 3,235,040 A     2/1966  Ellis
3,791,998 A  *  2/1974  Bruns ................... C08K 13/02
                                                   427/373
(Continued)

FOREIGN PATENT DOCUMENTS

CN    103862746 A    6/2014
EP    1065004 A1    1/2001
(Continued)

OTHER PUBLICATIONS

Oxford Dictionary on Lexico.com (https://www.lexico.com/en/definition/absorb), 2 pages. (Year: 2021).*
(Continued)

*Primary Examiner* — Matthew E. Hoban
*Assistant Examiner* — Lynne Edmondson
(74) *Attorney, Agent, or Firm* — Morgan, Lewis & Bockius LLP

(57) ABSTRACT

The present invention relates to a heat insulation composition, containing aerogel, with improved heat insulation and soundproofing properties, and a method for manufacturing a heat insulation fabric by using the same. The heat insulation composition is prepared by mixing solvent, aerogel powder, adhesive binder and carbon black powder, thereby improv-
(Continued)

ing the heat insulation property at an extremely low temperature and at a high temperature, and also enhancing the soundproofing property.

7 Claims, 1 Drawing Sheet

Related U.S. Application Data application No. PCT/KR2013/006708, filed on Jul. 26, 2013.

(51) Int. Cl.

| | |
|---|---|
| *D06M 11/74* | (2006.01) |
| *D06M 11/84* | (2006.01) |
| *D06M 11/46* | (2006.01) |
| *F16L 59/00* | (2006.01) |
| *D06M 11/49* | (2006.01) |
| *D06M 15/09* | (2006.01) |
| *D06M 15/263* | (2006.01) |
| *A41D 31/06* | (2019.01) |

(52) U.S. Cl.
CPC ............ *D06M 11/49* (2013.01); *D06M 11/84* (2013.01); *D06M 15/09* (2013.01); *D06M 15/263* (2013.01); *F16L 59/00* (2013.01); *A41D 31/06* (2019.02); *D06M 2400/02* (2013.01)

(58) Field of Classification Search
CPC .. D06M 2400/02; D06M 11/84; D06M 15/05; D06M 15/333; D06M 15/31; D06M 23/06; D06M 23/08; C04B 20/002; C04B 2103/56; C04B 14/064; B01J 13/0091; B29K 2027/18; B29K 2075/00; B29K 2995/0015; A41D 31/06
USPC ........................................................ 252/62
See application file for complete search history.

(56) References Cited

U.S. PATENT DOCUMENTS

| | | | | |
|---|---|---|---|---|
| 4,363,738 | A | * | 12/1982 | Kummermehr ......... C04B 26/02 252/62 |
| 4,403,023 | A | * | 9/1983 | Reiss ....................... F16L 59/04 429/120 |
| 4,726,870 | A | * | 2/1988 | McWilliams ........... C04B 30/00 156/146 |
| 5,124,101 | A | | 6/1992 | Hirao et al. |
| 5,830,548 | A | * | 11/1998 | Andersen ................ B32B 27/20 428/36.4 |
| 5,948,314 | A | | 9/1999 | Geiss et al. |
| 7,468,205 | B2 | | 12/2008 | Schwertfeger et al. |
| 2005/0100728 | A1 | | 5/2005 | Ristic-Lehmann et al. |
| 2006/0125158 | A1 | * | 6/2006 | Rouanet ................ E06B 3/6715 264/621 |
| 2007/0007495 | A1 | | 1/2007 | Hayes |
| 2009/0082479 | A1 | | 3/2009 | Cho |
| 2009/0148654 | A1 | | 6/2009 | Brown et al. |
| 2009/0183826 | A1 | | 7/2009 | Calvert |
| 2013/0012623 | A1 | | 1/2013 | Harkabus et al. |
| 2015/0209981 | A1 | | 7/2015 | Baek et al. |
| 2017/0203552 | A1 | | 7/2017 | D'Arcy et al. |

FOREIGN PATENT DOCUMENTS

| | | |
|---|---|---|
| EP | 1279885 A1 | 1/2003 |
| EP | 1787716 A1 | 5/2007 |
| EP | 2180114 A1 | 4/2010 |
| GB | 2187419 A | 9/1987 |
| JP | 11-128824 A | 5/1999 |
| KR | 10-19870000453 B1 | 3/1987 |
| KR | 940005759 B1 | 6/1994 |
| KR | 10-0783012 B1 | 12/2007 |
| KR | 2012 0028635 A | 3/2012 |
| KR | 20120133856 A | 12/2012 |
| KR | 10-1255631 B1 | 4/2013 |
| WO | WO 96/02695 A1 | 2/1996 |
| WO | WO 96/03353 A1 | 8/1996 |
| WO | WO 03/064025 A1 | 8/2003 |
| WO | WO 03/097227 A1 | 11/2003 |
| WO | WO 2005/047381 A1 | 5/2005 |
| WO | WO 2006/002440 A2 | 1/2006 |
| WO | WO 2006/100277 A1 | 9/2006 |
| WO | WO 2012/044052 A2 | 4/2012 |
| WO | WO 2014/025210 A1 | 2/2014 |

OTHER PUBLICATIONS

Armacell JIOS Aerogels Limited, Decision to Grant, EP13886647.0 dated May 8, 2017, 6 pgs.
Armacell JIOS Aerogels Limited, Certificate of Grant, EP13886647.0, dated May 30, 2018, 1 pg.
Joung, Office Action, U.S. Appl. No. 15/417,087, dated Feb. 15, 2019, 12 pgs.
Joung, Non-Final Office Action, U.S. Appl. No. 15/417,087, dated Mar. 3, 2020, 8 pgs.
JIOS Aerogel Corporation, Communication Pursuant to Rules 94 (3) EP14898765.4, dated Mar. 31, 2020, 7 pgs.
Anonymous: "S.3.6. Bulk Density and Tapped Density of Powders", Mar. 31, 2012, 1-6 pgs., XP055679407, Retrieved from the Internet: URL:http://www.who.int/medicines/publications/pharmacopoeia/Bulk-tapped-densityQAS11_450FINAL_MODIFIEDMarch2012.pdf [retrieved on Mar. 24, 2020].
Emre Mudam et al.: "Synthesis of SiO2 Aerogel via Ambient Pressure Drying Process Using Perlite Powder", 19th International Metallurgy & Materials Congress, Oct. 27, 2018 (Oct. 27, 2018), pp. 1-4, XP055679852, Retrieved from the Internet: URL:https://pdfs.Semanticscholar.org/2fbe/3c0e7a4666bbf2cc18772d5f855a78f4e42b.pdf [retrieved on Mar. 25, 2020].
JIOS Aerogel Limited, Communication Pursuant to Rules 161(2) and 162, EP13886647.0, dated Feb. 12, 2016, 2 pgs.
JIOS Aerogel Limited, Extended European Search Report, EP13886647.0, dated Mar. 28, 2017, 5 pgs.
JIOS Aerogel Limited, Communication Pursuant to Rules 70(2) and 70a(2), EP13886647.0, dated Apr. 18, 2017 1 pg.
JIOS Aerogel Limited, Communication Pursuant to Rules 161(2) and 162, EP13889597.4, dated Mar. 17, 2016, 2 pgs.
Armacell JIOS Aerogels Limited, Extended European Search Report, EP13889597.4, dated Mar. 29, 2017, 8 pgs.
Armacell JIOS Aerogels Limited, Communication Pursuant to Rule 114(2), EP13889597.4, dated May 8, 2017, 6 pgs.
Armacell JIOS Aerogels Limited, Decision to Grant, EP13889597.4, dated Aug. 8, 2019, 2 pgs.
JIOS Aerogel Corporation, Communication Pursuant to Rules 161(2) and 162, EP13890228.3, dated Mar. 2, 2016, 2 pgs.
Armacell JIOS Aerogesl Limited, Partial Supplementary European Search Report, EP13890228.3, dated Feb. 8, 2017, 8 pgs.
JIOS Aerogel Corporation, Communication Pursuant to Rules 70(2) and 70a(2), EP13890228.3, dated May 31, 2017, 1 pg.
JIOS Aerogel Corporation, Communication Pursuant to Article 94(3), EP13890228.3, dated Jan. 29, 2019, 4 pgs.
JIOS Aerogel Corporation, Communication Pursuant to Rules 161(2) and 162, EP14898765.4, dated Mar. 9, 2017, 2 pgs.
JIOS Aerogel Corporation, Extended European Search Report, EP14898765.4, dated Feb. 28, 2018, 8 pgs.
JIOS Aerogel Corporation, Communication Pursuant to Rules 161(2) and 162, EP15882073.8, dated Oct. 5, 2017, 2 pgs.
JIOS International Search Report and Written Opinion, PCT/KR2013/006533, dated Feb. 27, 2014, 14 pgs.
JIOS International Search Report and Written Opinion, PCTKR2013006708, dated Apr. 24, 2014, 14 pgs.
JIOS International Search Report and Written Opinion, PCT/KR2013/006538, dated Apr. 30, 2014, 7 pgs.

(56) References Cited

OTHER PUBLICATIONS

JIOS International Preliminary Report on Patentability, PCT/KR2013/006538, dated Jan. 19, 2016, 5 pgs.
Joung, Office Action, U.S. Appl. No. 14/896,936, dated Aug. 12, 2016, 12 pgs.
Joung, Final Office Action, U.S. Appl. No. 14/896,936, dated Apr. 20, 2017, 10 pgs.
Joung, Notice of Allowance, U.S. Appl. No. 14/896,936, dated Oct. 4, 2017, 8 pgs.
Joung, Office Action, U.S. Appl. No. 15/005,570, dated May 10, 2018, 18 pgs.
Joung, Final Office Action, U.S. Appl. No. 15/005,570, dated Jan. 10, 2019, 14 pgs.
Machine translation of JPH11-128824A, Hone, generated Nov. 21, 2016, 9 pgs.
Joung, Notice of Allowance, U.S. Appl. No. 15/417,087, dated Dec. 9, 2020, 8 pgs.

* cited by examiner

HEAT INSULATION COMPOSITION FOR IMPROVING HEAT INSULATION AND SOUNDPROOFING FUNCTIONS, CONTAINING AEROGEL, AND METHOD FOR MANUFACTURING HEAT INSULATION FABRIC BY USING SAME

RELATED APPLICATIONS

This application is a divisional application of U.S. patent application Ser. No. 15/005,570, filed Jan. 25, 2016, which is a continuation application of the international patent application number PCT/KR2013/006708, filed Jul. 26, 2013, which claims the priority to the Korean patent application number 10-2013-0087396, filed Jul. 24, 2013, all of which are incorporated by reference herein in their entireties.

TECHNICAL FIELD

The present invention relates generally to material compositions with improved heat insulation and soundproofing properties, and more specifically to material compositions containing aerogel with improved heat insulation and soundproofing properties, methods for manufacturing such material compositions, and methods for manufacturing fabrics using such material compositions.

BACKGROUND

Generally, aerogel, made of silicon oxide ($SiO_2$), has been recognized as a novel material, which has drawn attention, since its discovery in the 1930s, as an insulation material, an impact absorbing material, and a soundproofing material, etc. as it is resistant to heat, electricity, sound, and impact, etc., and is only three times as heavy as air of the same volume. In addition, aerogel is formed of silicon oxide threads having a diameter of one ten-thousandth of human hair, tangled extremely sparsely, and air molecules occupy the space between threads, and air accounts for 98% of the total volume. Because aerogel has very low heat conductivity, it is highly favored as a heat insulation material.

However, as described above, aerogel has low mechanical stability due to its high porosity and low density, and it was not easy to include aerogel in a heat insulator.

Korean Patent No. 0998474 discloses a technique addressing the above. In short, the patent describes aerogel and a polymer coating a part or an entire surface of aerogel.

However, when the polymer penetrates into the inside of aerogel, porosity is reduced and its heat insulation property is significantly decreased. In addition, other properties of aerogel were also adversely affected. Therefore, there is a demand for a material composition capable of using and/or improving heat insulation properties and other properties of aerogel.

SUMMARY OF THE INVENTION

It is an objective of the present invention to provide a heat insulating material composition containing aerogel with heat insulation and soundproofing properties, the heat insulating material composition prepared by mixing adhesive binder and an additive including carbon black powder with aerogel powder for further improving heat insulation and soundproofing properties, and a method for manufacturing a heat insulation fabric using the same.

In order to achieve the above objective, a heat insulating material composition containing aerogel, with improved heat insulation and soundproofing properties, includes solvent, aerogel powder, adhesive binder, and carbon black powder.

The heat insulating material composition is a mixture of 80 to 100 parts by weight of the solvent, 3 to 5 parts by weight of the aerogel powder, 1 to 2 parts by weight of the adhesive binder, and 1 to 5 parts by weight of the carbon black.

The carbon black powder has a particle with a diameter of 10 μm or less and a density of 0.06 to 0.15 $g/cm^3$.

The adhesive binder includes at least one of celluloses, starches, epoxies, polyvinyl alcohol, urethanes, and carboxymethylcellulose (CMC).

In some embodiments, the additive includes at least one type of mineral oxides (e.g., inorganic oxides), such as titanium dioxide, silicon carbide, and/or iron hydroxide (e.g., hematite or magnetite), and the mineral oxide has a particle with a diameter of 10 μm or less and is added in a weight ratio of 1 to 5 with respect to the mixture of the solvent, adhesive binder, aerogel powder, and carbon black powder.

In some embodiments, the additive includes a porous mineral oxide (e.g., inorganic oxide), such as fumed silica or glass bubbles.

In some embodiments, the additive includes an aqueous acrylic resin in a weight ratio of 3 or less with respect to the mixture of the solvent, adhesive binder, aerogel powder, and carbon black powder.

In some embodiments, the additive includes ethylene glycol or propylene glycol, which is antifreeze.

Meanwhile, in accordance with the present invention, a method for manufacturing a heat insulation fabric using the heat insulation composition, containing aerogel, for improved heat insulation and soundproofing properties includes step 10 of manufacturing the heat insulation composition (S10); step 20 of coating the heat insulation composition on the outer surface of the moving fabric (S20); and step 30 of applying pressure to the outer surface of the fabric, for the heat insulation composition to be absorbed into the inside of fabric (S30). Step 10 (S10) includes step 11 of preparing an aqueous binder mixture by mixing solvent and adhesive binder (S11); step 12 of adding a first additive to the aqueous binder mixture and mixing (S12); step 13 of adding aerogel powder to the aqueous binder mixture and dispersing (S13); step 14 of adding a second additive to the dispersion where the aerogel powder and first additive are mixed with the aqueous binder mixture (S14); and step 15 of adding carbon black powder in a state where the second additive is mixed and dispersing (S15).

In step 10 (S10), 80 to 100 parts by weight of water as the solvent, 1 to 2 parts by weight of CMC as the additive binder, 3 to 5 parts by weight of the aerogel powder, and 1 to 5 parts by weight of the carbon black powder with a particle of 10 μm or less and a density of 0.06 to 0.15 $g/cm^3$ are mixed.

Also, in step 12 (S12), as the first additive, at least one of an aqueous acrylic resin, porous mineral oxide powder (e.g., inorganic oxide powder) including fumed silica and/or glass bubble, and antifreeze including at least one of ethylene glycol and propylene glycol is added in a weight ratio of 1 to 2 with respect to the mixture of the solvent, adhesive binder, aerogel powder, and carbon black powder.

Also, in step 14 (S14), as the second additive, at least one of mineral oxide (e.g., inorganic oxide) with a particle of 10 μm or less including rutile titanium dioxide, silicon carbide, and hematite and magnetite is added in a weight ratio of 1 to 5 with respect to the mixture of the solvent, adhesive binder, aerogel powder, and carbon black powder.

Further, in step 30 (S30), a roller is prepared similar or greater than a width of the fabric, and arranged to contact both surfaces or one surface of the fabric, for the heat insulation composition to be absorbed into the fabric with the pressure of the roller, or a blade is prepared similar or greater than a width of the fabric and with an elastic lower part having a sharp-shaped side, wherein the lower part is bent to contact the transferred fabric, and applies pressure to the fabric, for the heat insulation composition to be absorbed into the fabric.

As described above, according to the present invention, heat insulation properties are enhanced at an extremely low temperature by adding the carbon black powder to the composition containing aerogel.

Heat insulation properties at a high temperature are enhanced by adding to the composition one or at least one of titanium dioxide ($TiO_2$), silicon carbide (SiC), and iron hydroxide, such as hematite ($Fe_2O_3$) and magnetite ($Fe_2O_4$).

In addition, heat insulation and soundproofing properties are enhanced while maintaining pores open after drying the composition, by adding to the composition porous mineral oxide (e.g., inorganic oxide), such as fumed silica and glass bubbles.

In addition, by adding ethylene glycol or propylene glycol to the composition, surface cracking is prevented or reduced when drying the composition, and the rate of drying the composition can be controlled by adjusting the amount of the additive.

BRIEF DESCRIPTION OF DRAWINGS

The accompanying drawings attached to the specification illustrate embodiments of the present invention, which, when viewed in conjunction with the detailed description of the invention, assist better understanding of the technical aspects of the present invention. However, the drawings should not be construed to limit the scope of the present invention.

COMPOSITION

Figure 1:
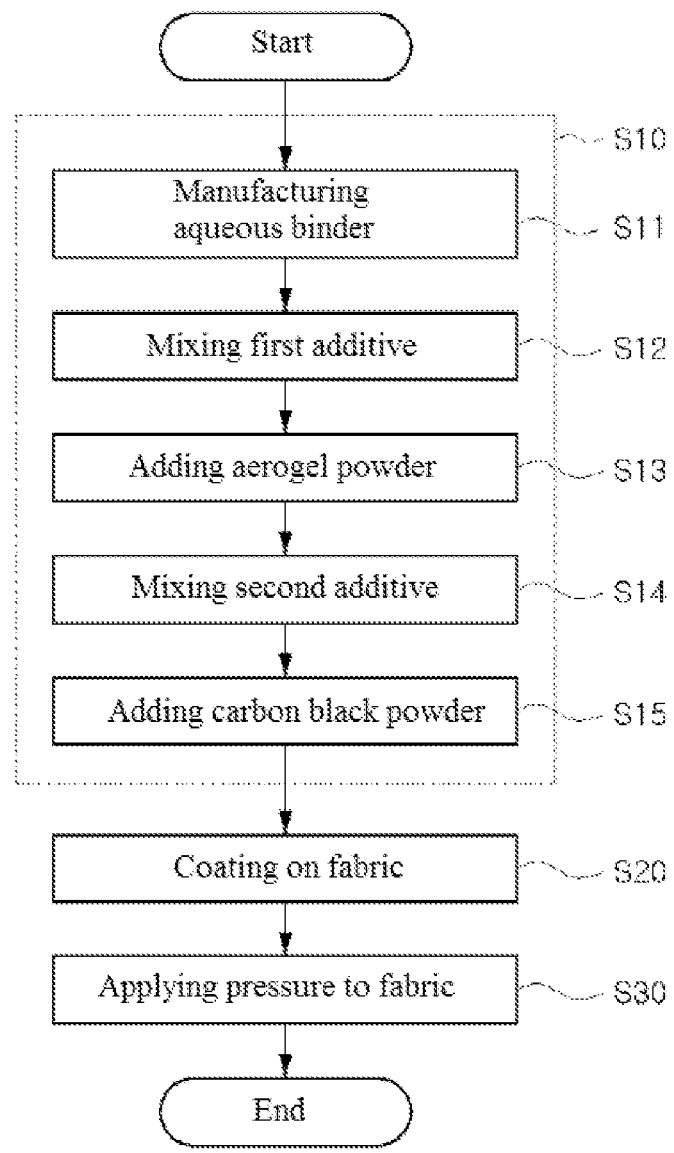
FIG. 1 is a flow chart illustrating a method for manufacturing a heat insulation fabric using a heat insulation composition, containing aerogel, with improved heat insulation and soundproofing properties, according to an embodiment of the present invention.

A heat insulation composition with improved heat insulation and soundproofing properties, containing aerogel, according to the present invention is prepared by mixing aerogel powder, carbon black powder, adhesive binder, and an additive with solvent.

The heat insulation composition according to the present invention is prepared by mixing 3 to 5 parts by weight of the aerogel powder, 1 to 2 parts by weight of the adhesive binder, 1 to 5 parts by weight of the carbon black powder, and the additive with 80 to 100 parts by weight of the solvent.

The solvent is water, which is readily available.

Aerogel, which is highly porous nanospheres, is good at insulating heat, electricity, sound, and impact, and has a low weight. Thus, aerogel has been recognized as a next-generation heat insulation material that can replace the conventional construction insulation material, such as glass fiber. Aerogel is expected to reduce heating and cooling energy by 30 to 50%, and is currently used in various applications ranging from LNG ships, automobiles, airplanes, and pipes for exploring offshores, to thin ski jackets, boots, gloves, flame retardant super insulation materials, spacesuits, spacecraft, special armor against impact, and impact shielding films, etc. However, aerogel is fragile, easily breakable, and can be well absorbed, thereby inappropriate to be used alone. The present invention aims to manufacture a composition with improved soundproofing performance in addition to heat insulation performance, while minimizing its disadvantages, by using the powder of aerogel.

Also, as the adhesive binder, which is a material providing adhesion to the aerogel powder and carbon black powder, at least one of celluloses, starches, epoxies, polyvinyl alcohol and urethanes is used. Particularly, CMC is preferably used.

Also, the addition of an aqueous acrylic resin to the adhesive binder inhibits scattering of the powder such as the aerogel powder, carbon black powder, and additive, etc., after drying the fabric coated with the heat insulation composition according to the present invention, and particularly it is excellent in inhibiting scattering of the aerogel powder. Here, the aqueous acrylic resin is added in a weight ratio of 3 or less with respect to the mixture of the solvent, adhesive binder, aerogel powder, and carbon black powder.

Also, when the heat insulation composition according to the present invention is coated on the fabric and dried, surface cracking can be prevented or reduced by adding antifreeze, such as ethylene glycol and/or propylene glycol, to the adhesive binder, and the rate of drying can be controlled by adjusting the amount of the antifreeze.

Carbon black, which is a micro carbon powder in black, is typically obtained by partially combusting hydrocarbon in the form of soot. The carbon black powder has the particle size of 1 to 500 μm, which is similar to that of graphite, and is a crystalline material with lower regularity than graphite. Industrially, the carbon black particle is manufactured by collecting soot generated from incomplete combustion of natural gas, tar, etc., or pyrolyzing it. The carbon black powder has porous properties with nanopores and enhances a heat insulation effect in an extremely low-temperature region. In order to maximize the effect, the carbon black powder introduced into the present invention has the particle size of 10 μm or less, and the density of 0.06 to 0.15 $g/cm^3$, preferably about 0.1 $g/cm^3$.

Further, as the additive, at least one of mineral oxide (e.g., inorganic oxide) including titanium dioxide ($TiO_2$), silicon carbide (SiC), and hematite ($Fe_2O_3$) and magnetite ($Fe_2O_4$), etc. as the type of iron hydroxide is used. Here, the mineral oxide has the particle size of 10 or less, and is added in a weight ratio of 1 to 5 with respect to the mixture of the solvent, adhesive binder, aerogel powder, and carbon black powder. At this time, rutile titanium dioxide is used as titanium dioxide. The reason of using the mineral oxide as the additive is that the mineral oxide can enhance a heat insulation effect at a high-temperature region.

In addition, as the additive, porous mineral oxide (e.g., porous inorganic oxide) including fumed silica, glass bubble is further included, and the porous mineral oxide is added in powder form. When the heat insulation composition according to the present invention is coated on the fabric and dried, with the additive, heat insulation and soundproofing effects can be enhanced by maintaining pores of the heat insulation composition coated.

Manufacturing Method

FIG. 1 is a flow chart illustrating a method for manufacturing a heat insulation fabric using a heat insulation composition, containing aerogel, with improved heat insulation and soundproofing properties, according to a preferred embodiment of the present invention.

As illustrated in FIG. 1, the method for manufacturing a heat insulation fabric using the heat insulation composition according to the present invention first includes manufacturing the heat insulation composition (S10). In this step, water as solvent, adhesive binder, aerogel, carbon black powder, and various additives are introduced and stirred at a velocity of about 500 to 700 rpm for manufacturing the composition. This step is described in detail.

First, an aqueous binder mixture is prepared by mixing the solvent and the adhesive binder (S11). At this time, 1 to 2 parts by weight of the additive binder CMC is mixed with 90 parts by weight of water and stirred.

Next, a first additive is introduced into the aqueous binder mixture and mixed (S12).

Here, as the first additive, an aqueous acrylic resin is added to the aqueous binder mixture, and the aqueous acrylic resin is added in a weight ratio of 3 or less, for example in a weight ratio of 1 to 2, with respect to the mixture of the solvent, adhesive binder, aerogel powder, and carbon black powder. The aqueous acrylic resin inhibits scattering of powder materials to be mixed later.

Further, as the first additive, the antifreeze, such as ethylene glycol and/or propylene glycol, is further added to the aqueous binder mixture. The ethylene glycol or propylene glycol prevents or inhibits surface cracking when the heat insulation composition according to the present invention is coated on the fabric and dried, and the drying velocity is controlled by adjusting an addition amount as needed.

In addition, as the first additive, porous mineral oxide powder (e.g., porous inorganic oxide powder) including fumed silica, glass bubble, etc. is added to the aqueous binder mixture. The porous powder maintains pores even after the heat insulation composition according to the present invention is coated on the fabric and dried, thereby enhancing heat insulation and soundproofing effects. As such, the aqueous binder mixture is prepared by mixing the solvent, adhesive binder, and various additives.

Next, aerogel powder is added to the aqueous binder mixture and dispersed (S13). Here, 3 to 5 parts by weight of the aerogel powder is added to the aqueous binder mixture and stirred. At this time, the scattering of the aerogel powder is inhibited by the aqueous acrylic resin. Further, when the aerogel powder is directly dispersed in the solvent, the dispersion is not performed well, and the aerogel powder is thick on the upper part of the solvent for having no viscosity. In order to prevent this state, aerorgel is introduced into the aqueous binder mixture where adhesive binder is mixed with the solvent, and dispersed.

Next, a second additive is introduced into the dispersion where the aerogel powder and first additive are mixed with the aqueous binder mixture and mixed (S14). As the second additive, mineral oxide, such as one or at least one of titanium dioxide ($TiO_2$), silicon carbide (SiC), and iron hydroxide, such as hematite ($Fe_2O_3$) and magnetite ($Fe_3O_4$), is mixed and introduced. At this time, the mineral oxide has a particle of a diameter of 10 μm or less, and is added in a weight ratio of 1 to 5 with respect to the mixture of the solvent, adhesive binder, aerogel powder, and carbon black powder. The mineral oxide with the size of micro particle enhances a heat insulation effect at a high-temperature region.

Finally, carbon black powder is added and dispersed (S15). Here, 1 to 5 parts by weight of the carbon black powder is added. Further, the scattering of the carbon black powder is inhibited by the aqueous acrylic resin. At this time, the carbon black powder has a particle of about 10 μm or less and a density of about 0.06 to 0.15 $g/cm^3$.

Next, the thus-prepared composition is coated on the outer surface of the transferred fabric (S20).

Finally, the outer surface of the fabric coated with the composition is pressurized by a roller or blade (S30). Thereby, the composition coated on the outer surface of the fabric is absorbed into the inside of fabric.

Here, a roller is arranged to contact both surfaces or one surface of the fabric, for the heat insulation composition to be absorbed into the fabric with the pressure of the roller. Of course, the roller has a length similar or greater than that of the fabric.

As another example, a blade is prepared with an elastic lower part having a sharp-shaped side, and the lower part is bent to contact the transferred fabric in a wide area and applies predetermined pressure to the fabric, for the composition coated on the outer surface of the fabric to be absorbed into the inside of fabric. Of course, the blade has a length similar or greater than the fabric.

As described above, a person skilled in the art to which the present invention pertains can understand that the present invention can be carried out in different embodiments without modifying the technical sprit or essential characteristics. Thus, it should be understood that the above-described embodiments are by way of example in every aspect, and are not intended to limit the present invention. The scope of the present invention is defined by the following claims, rather than by the detailed description. Further, it should be appreciated that all modifications or modified forms derived from the definition, scope, and equivalents of the claims fall under the scope of the present invention.

What is claimed is:

1. A method for manufacturing a heat insulation fabric using a heat insulation composition, the method comprising:
    step 10 of manufacturing a heat insulation composition (S10), the heat insulation composition including 80 to 100 parts by weight of water as solvent, 3 to 5 parts by weight of aerogel powder, 1 to 2 parts by weight of adhesive binder, and 1 to 5 parts by weight of carbon black powder having a particle of a diameter of 10 μm or less and a density of 0.06 to 0.15 $g/cm^3$;
    step 20 of coating the heat insulation composition on an outer surface of a fabric while the fabric is moving (S20); and
    step 30 of applying pressure to the outer surface of the fabric coated with the heat insulation composition including 80 to 100 parts by weight of the water as solvent, for the heat insulation composition to be absorbed into an inside of the fabric (S30).

2. The method of claim 1, wherein the step 10 (S10) includes:
    step 11 of preparing an aqueous binder mixture by mixing the solvent and the adhesive binder (S11);
    step 12 of adding a first additive to, and mixing, the aqueous binder mixture (S12);
    step 13 of adding to, and dispersing within, the aqueous binder mixture the aerogel powder (S13);
    step 14 of adding a second additive to the dispersion in which the aerogel powder and the first additive are mixed with the aqueous binder mixture (S14); and
    step 15 of adding to, and dispersing within, the dispersion containing the second additive the carbon black powder (S15).

3. The method of claim 2, wherein in step 12 (S12), at least one of aqueous acrylic resin, porous mineral oxide powder including fumed silica and/or glass bubble, and antifreeze of ethylene glycol and/or propylene glycol is added as the first additive in a weight ratio of 1 to 2 with respect to the mixture of the solvent, the adhesive binder, the aerogel powder, and the carbon black powder.

4. The method of claim 2, wherein in step 14 (S14), at least one inorganic oxide, selected from a group comprising rutile titanium dioxide, silicon carbide, hematite, and magnetite, with a particle of a diameter of 10 μm or less, is added as the second additive in a weight ratio of 1 to 5 with respect to the mixture of the solvent, the adhesive binder, the aerogel powder, and the carbon black powder.

5. The method of claim 1, wherein in step 30 (S30), a roller has a width that is similar to or greater than a width of the fabric, and arranged to contact both surfaces or one surface, for the heat insulation composition to be absorbed into the fabric with the pressure of the roller, and a blade is prepared similar or greater than a width of the fabric and with an elastic lower part having a sharp-shaped side, wherein the lower part is bent to contact the transferred fabric, and applies pressure to the fabric, for the heat insulation composition to be absorbed into the fabric.

6. The method of claim 1, wherein the adhesive binder includes at least one of celluloses, starches, epoxies, polyvinyl alcohol and urethanes, and carboxymethylcellulose.

7. The method of claim 1, wherein as an additive, at least one mineral oxide selected from a group of titanium dioxide, silicon carbide, and iron hydroxide is added, and the mineral oxide has a particle of a diameter of 10 μm or less and is added in a weight ratio of 1 to 5 with respect to the mixture of the solvent, adhesive binder, aerogel powder, and carbon black powder.

* * * * *